R. RUBIN.
DRESS FORM.
APPLICATION FILED JUNE 24, 1908.
945,611.
Patented Jan. 4, 1910.
6 SHEETS—SHEET 1.
FIG. I.
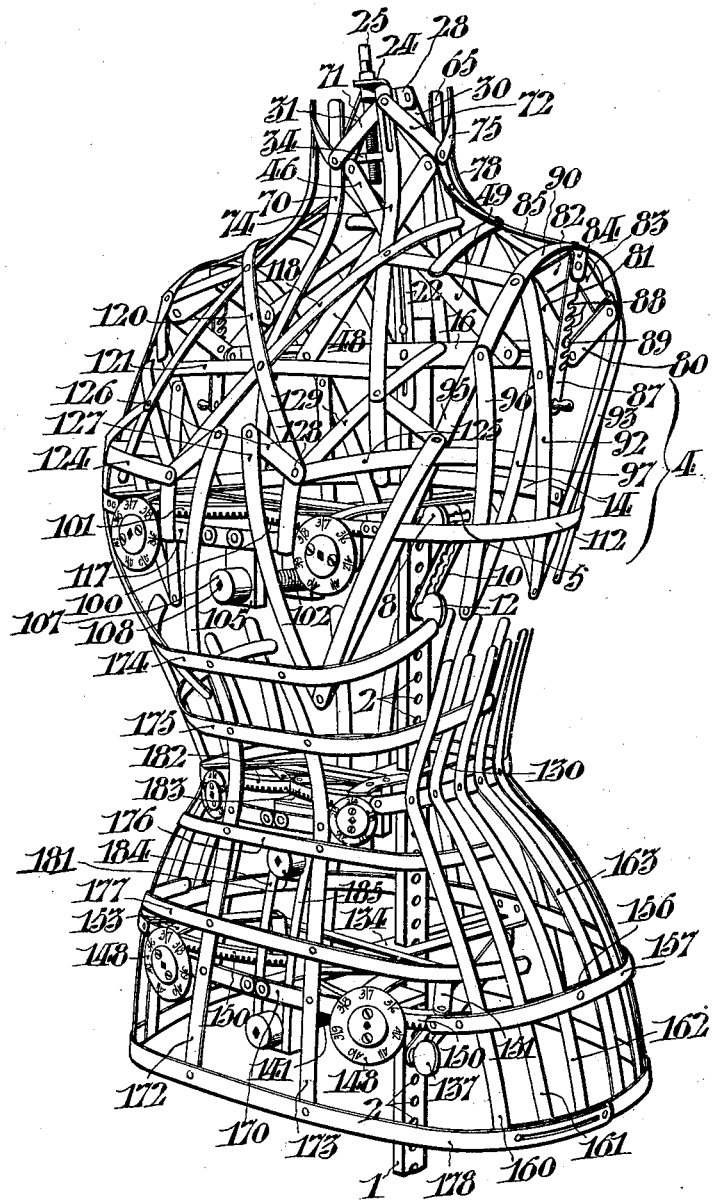
WITNESSES:
INVENTOR:
ROBERT RUBIN,

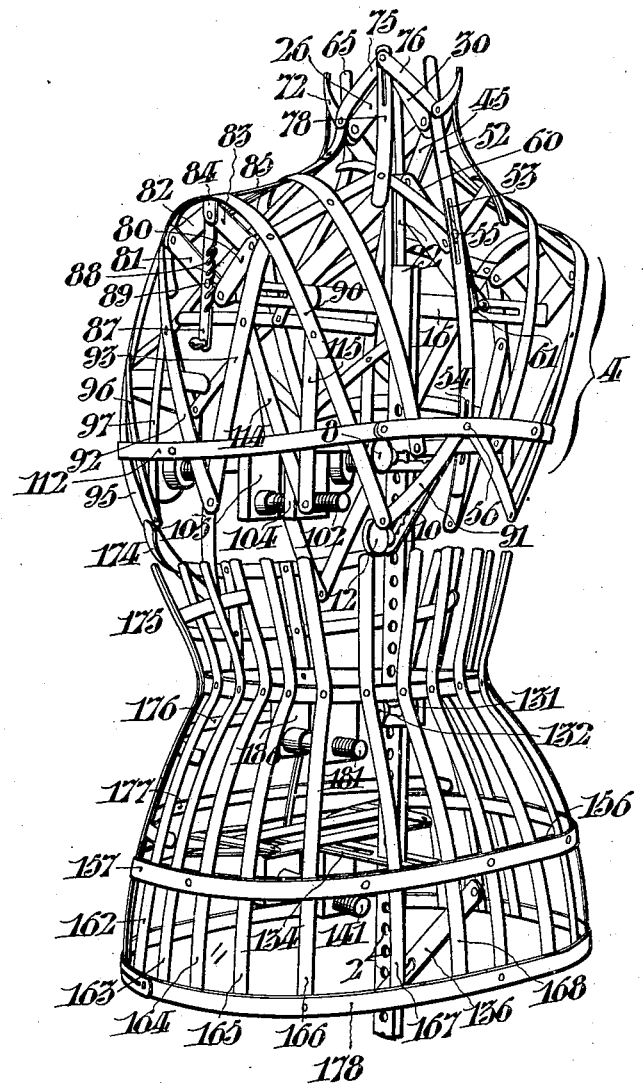

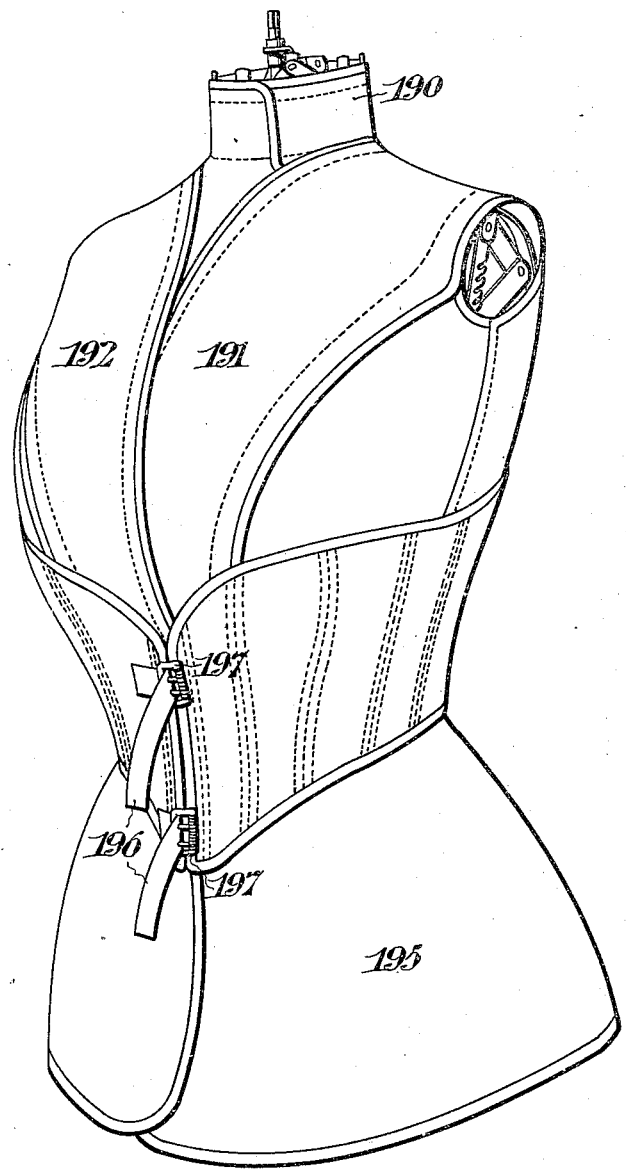

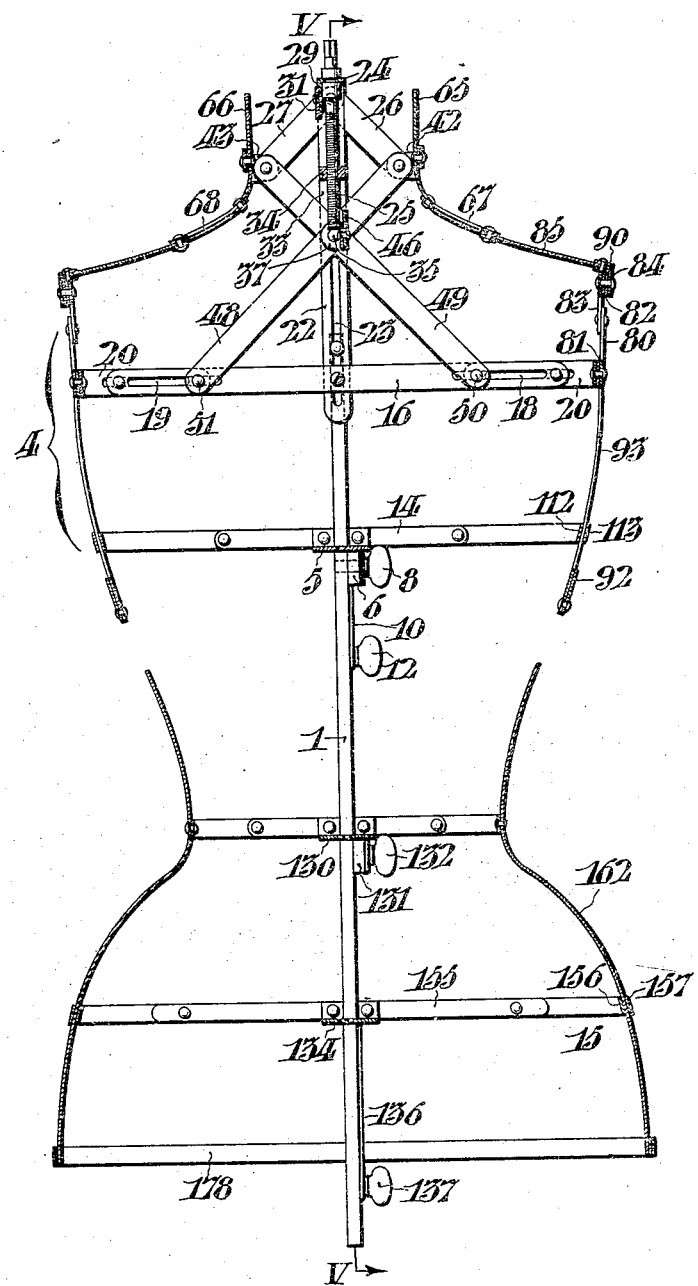

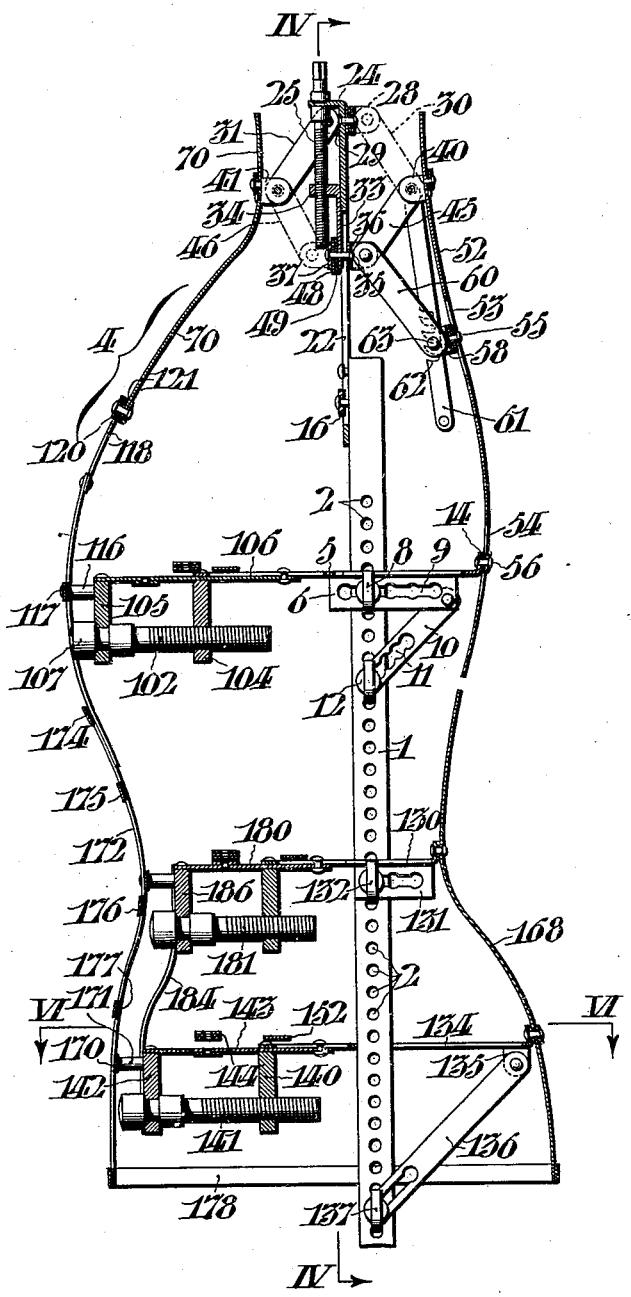

R. RUBIN.
DRESS FORM.
APPLICATION FILED JUNE 24, 1908.
945,611.
Patented Jan. 4, 1910.
6 SHEETS—SHEET 6.
FIG. VI.
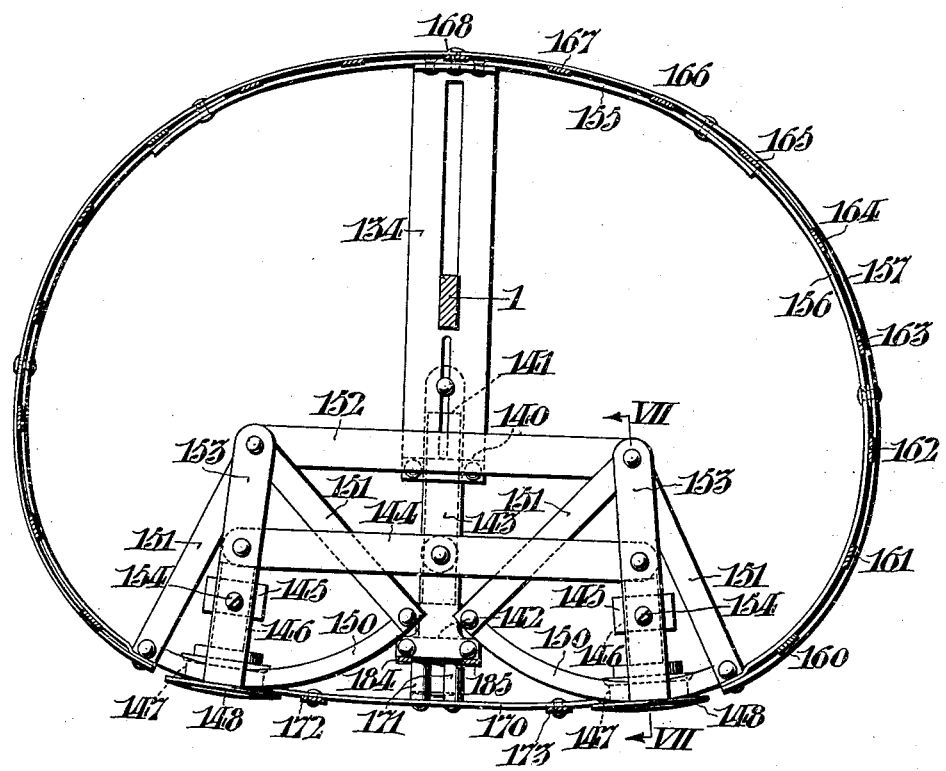
FIG. VII.
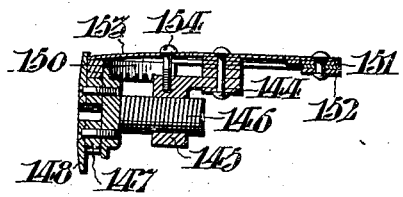
FIG. VIII.
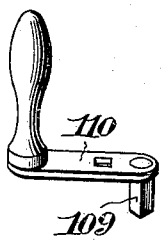
WITNESSES:
John C. Bergner
Wm. Sperl
INVENTOR:
ROBERT RUBIN,
by his Attorneys
Tuley & Paul

UNITED STATES PATENT OFFICE.

ROBERT RUBIN, OF PHILADELPHIA, PENNSYLVANIA, ASSIGNOR OF ONE-HALF TO MAXIMILIAN KNOLL, OF PHILADELPHIA, PENNSYLVANIA.

DRESS-FORM.

945,611.  Specification of Letters Patent.  Patented Jan. 4, 1910.

Application filed June 24, 1908.   Serial No. 440,059.

*To all whom it may concern:*

Be it known that I, ROBERT RUBIN, of Philadelphia, in the county of Philadelphia and State of Pennsylvania, have invented certain new and useful Improvements in Dress-Forms, whereof the following is a specification, reference being had to the accompanying drawings.

My invention relates to dress forms and has for its object the production of a framework which is capable of a variety of adjustments corresponding to the general outer contour of a typical woman's figure from the neck to a point below the hips.

It comprises an outer system of metal contour plates which are adjustably supported and capable of manipulation by mechanism operatively connected therewith to vary the dimensions and outer shape of the form.

The form may be conveniently divided into two sections capable of independent manipulation and adjustment, both with relation to expansion and contraction, and also with relation to one another. For convenience these sections may be designated "upper section", comprising the chest, shoulder and neck portions; and "lower section", comprising the waist and hip portions. The adjusting mechanism and a portion of the contour framework of the upper section may be raised or lowered to vary the characteristics of said section. The "lower section" may be raised or lowered to vary the length of the waist and tilted to vary the waist line and lower form. In addition to the upper and lower sections the form may for convenience be considered as being composed of laterally expansible neck, bust, waist and hip zones.

In the accompanying drawings, Figure I, is a perspective view showing the front of the form; Fig. II, is a similar perspective view showing the back of said form. Fig. III, is a perspective view showing a convenient form of cover applied to the form. Fig. IV, is a central vertical section taken on the line IV, IV, of Fig. V. Fig. V, is a central vertical section on line V, V, of Fig. IV. Fig. VI, is a horizontal section on line VI, VI, of Fig. V. Fig. VII, is a vertical section on line VII, VII, of Fig. VI. Fig. VIII, is a perspective view of a key to be used in adjusting the form.

In said drawings, the supporting stem 1, extends upwardly from a suitable support or pedestal (not shown), and is provided with a series of holes 2, for adjusting purposes.

The upper section 4, comprises a plate 5, having a depending projection 6, which may be clamped against the stem 1, by means of a screw 8. Said screw 8, also acts as a pivot for the upper section, whereby its general inclination with relation to the vertical may be varied. By means of the elongated slot 9, in said projection 6, the plate 5, may be moved horizontally and the relation of bust zone with respect to the remainder of the figure may be varied. A plate 10, is pivotally connected at one end to the projection 6, and provided with a slot 11, through which the adjusting screw 12, passes. Said plate 10, acts as a stay to aid in maintaining said upper section in its adjusted position. The rear end of the plate 5, is bent upwardly and to this end a strip 14, is secured extending horizontally across the back of the form to act as a guide and support for some of the contour plates.

Near the upper end of the stem 1, a horizontal plate 16, is secured by means of a screw, or in any other suitable manner, and said plate is provided near each end with a slot 18, 19. Slidably attached to each end of the plate 16, is an angle plate 20.

Slidably mounted upon the upper end of the stem 1, is a slotted vertical plate 22, which is bent at right angles at its upper end to form a bearing 24, for the adjusting screw 25. Pivotally attached to said vertical plate 22, are the links 26, and 27, and mounted upon this pivot are the angle plates 28, and 29, to which the links 30, and 31, are respectively pivoted at their upper ends.

Slidably mounted upon the plate 22, is a bracket 33, having a horizontal portion 34, which is threaded to receive the adjusting screw 25. A pin 35, in the lower end of said bracket 33, rides in the slot 23, thereby acting as a guide for said bracket, and also as a support for the angle plates 36, and 37.

The links 30, and 31, are pivotally connected at their lower ends to blocks 40, and 41, respectively, and the links 26, and 27, are similarly pivoted to blocks 42, and 43, respectively. Links 45, and 46, are pivoted at their upper ends to blocks 40, and 41, respectively, and at their lower ends to the angle plates 36, and 37, respectively. A pair of levers 48, and 49, are fulcrumed about the pivot 35, and are pivotally connected at their upper ends to the blocks 42, and 43, respectively. The lower end of each of said levers is provided with a pin 50, 51, arranged to slide in the slots 18, and 19, respectively, in the plate 16, and pass through holes in the plates 20. By the movement of said levers, the plates 20, may be moved inwardly or outwardly to narrow or widen the frame. By sliding the plate 22, up or down, the mechanism connected therewith may also be raised or lowered, thereby changing the height of the neck zone.

A plate 52, is secured to the block 40, and extends from the neck throughout the center of the back, and is provided with slots 53, and 54, through which pins or screws 55, and 56, pass to hold said plate in slidable relation with the plate end 14, and an angle plate 58. Said angle plate 58, is pivotally attached to the lower end of a link 60, which is pivotally attached at its upper end to the angle plate 36.

Pivoted at its upper end to the block 40, is an adjusting lever 61, having a series of notches 62, for engagement with a pin or screw 63, projecting laterally from the angle plate 58, and also acting as a pivot for the link 60. By means of said lever the back may be made to bulge out more or less near the region of the angle plate 58.

Plates 65, and 66, form the sides of the neck and are secured to the blocks 42, and 43, respectively, being each provided near their lower extremities with elongated slots 67, and 68, respectively.

A plate 70, forming the center of the front of the neck is secured to the block 41, and extends downward centrally of the chest. Pivotally attached to the blocks 41, and 42, respectively are the inclined links 71, and 72, which are united at their upper ends, and from this point extends a plate 74, diagonally across the chest; said plate being slotted at its upper end.

Pivotally attached to the blocks 42, and 40, respectively, are links 75, and 76, which are united at their upper ends and support at their junction the downwardly and diagonally extending plate 78. The other side of the neck is similarly formed and need not, therefore, be specifically described.

Pivotally attached at their lower ends to the plates 20, are the links 80 and 81, said links being in turn pivotally secured at their upper ends to angle plates. Pivotally attached to said angle plates at their lower ends are the links 82, and 83, which in turn are pivoted at their upper ends to an angle plate 84. Said plate 84, is secured to the under side of a plate 85, forming the top of the shoulder of the form, and adjustably connected with plate 65. A lever 87, is fulcrumed at its upper end to the angle plate 84, and provided with a series of notches 88, for engagement with a pin 89, on the link 81. By means of this lever and the connected links the shoulder may be raised or lowered. By turning the adjusting screw 25, so as to draw the plate 34, upward, the pivoted links are caused to assume a more nearly horizontal position and the neck correspondingly increased in diameter. The lower ends of levers 48, and 49, are thereby also spread farther apart, thus increasing the width of the form at the region of the arm holes. If the screw 25, is turned to move the plate 34, downward, the neck is decreased in diameter and the form is narrowed at the region of the arm holes.

Fastened to the upper side of the angle plate 84, is a plate 90, which extends from a point at the front of the shoulder, over said shoulder at its edge, and to a point in the vicinity of the middle of the back. Connecting this back lower extremity of said plate with the screw 56, is a plate 91. Attached to the plate 90, at the front and back of the shoulder are plates 92, and 93, which are united at their lower ends and extend in a generally vertical direction.

Attached near the front end of plate 90, is a downwardly extending plate 95, curved to conform to the chest and bust. A pair of plates 96, 97, are attached at their upper ends to the plates 95, and 92, respectively, and secured together at their lower ends.

In order to expand and contract the bust portion of the model the following mechanism is provided:—a pair of sector racks 100, and 101, for expanding and contracting the sides and contiguous front portions; and an adjusting screw 102, for moving the central front portion in and out, and the rack mechanism therewith. Depending from the under side of the plate 5, is a plate 104, which is threaded to receive the adjusting screw 102. The front end of said screw is journaled in a plate 105, depending from a plate 106, which is slidably secured to plate 5, and slides in a groove in the upper side of plate 104. The outer end or head 107, of the screw 102, is provided with a socket 108, for the reception of the projection 109, on the key 110. The details of this adjusting mechanism are essentially like those about to be described in connection with the lower section. Extending from the outer end of the sector rack 100, to the plate 14, are a pair of plates 112, and 113, between which the lower ends of plates 90, 92, 93, 95, 96, 97, 114, and 115, are passed and adapted to slide. By pivotally connecting the plates to one another and to their various supports they are enabled to change their relative positions readily so as to conform to the desired shape of the form. Projecting from the front of plate 105, are two posts 116, to which a horizontal plate 117, is attached. This plate acts as a guide for the front plates at the front of the bust.

The framework for the chest comprises a pair of diagonal plates 118, and 120, and a horizontal plate 121, all united at a common point at their centers. The lower extremities of plates 118, and 120, are connected to plates 124, and 125, respectively, which pass across the front and are bent around to the sides. A pair of plates 126, and 127, are pivotally connected together at one end and their other ends are connected to the ends of plates 125, and 95, respectively, thus extending over the front and to the lower extremity of the upper frame. Connecting the point 128, with the extremity of the plate 74, is the plate 129.

The lower section comprises a plate 130, having a depending portion 131, which is adapted to be clamped against the stem 1, by means of a screw 132. Said screw 132, also acts as a pivot about which the lower section may be tilted to vary the position of the waist and the relation of the lower portion of the form to the upper portion.

At the region of the hips a plate 134, is attached to the framework and provided with a depending lug 135, to which a slotted link 136, is attached. Said link is clamped to the stem 1, by a screw 137, and acts as a brace, for steadying the lower section. At the front end of plate 134, is a depending plate 140, which is threaded to receive an adjusting screw 141. Said screw 141, is journaled near its forward end in a bearing plate 142, which depends from a plate 143, which is slidably attached to the plate 134, and guided in a groove in the upper side of plate 140.

Secured to the plate 143, is a plate 144, having at each end a depending nut 145, through which an adjusting screw 146, passes. Attached to the head of the screw 146, is a gear 147, and an index plate 148, having numerals on its face to indicate the size of the form as adjusted. Said gear 147, meshes with teeth on the under side of a sector shaped rack 150, which is supported at each end by arms 151, pivotally connected together and to a plate 152. Said plate 152, is in turn supported at each end by a plate 153, which bears against the upper side of the rack 150, and may be adjusted by means of a screw 154, to act as a friction plate for said rack.

The rear end of the plate 134, is bent upwardly and to this end a strip 155, is secured. Between one end of this strip and the outer end of the circular rack 150, a pair of plates 156, and 157, are attached having spaces between them for the reception of the longitudinally extending side and rear contour plates 160, to 168.

A plate 170, extends across the front between the index plates 148, and is supported by a pair of posts 171, projecting from the front of plate 142. The plate 170, supports the longitudinally extending front plates 172, and 173, to which the transversely extending front plates 174, to 178, are attached. Said transverse plates extend across the front and around to the sides of the figure.

Slidably attached to the plate 130, is a plate 180, having means for supporting an adjusting screw 181, and also sector racks 182, 183, similar to racks 150, described above. As a means for providing proper rigidity between the adjusting mechanism, a pair of straps 184, 185, are attached to the plates 186, and 142.

It will be noted by reference to Fig. VI, that when the adjusting screw 146, is turned to move the sector rack 150, toward the right the form will be caused to expand in an increasing ratio beginning at a region near the end of plate 155, and extending around to the front. As said adjusting screw controls the lateral expansion and contraction of one-half of a section, it may be termed a "semi-lateral" variation in size. The screw 146, is left-handed in order that the rack may be drawn outwardly at the same time that it is rotated in order to maintain the proper relation of the parts. The index plate 148, will indicate when the desired size has been attained. The screw 141, is turned to bring out the racks and front plates 172, and 173, and the plates connected thereto, into the proper position. By manipulating the screw 132, and 137, the lower section may be tilted to vary the relations of the upper and lower front and rear. By raising and lowering the lower section the length of the waist may be varied.

In the use of the dress form I have found it convenient to provide a cover comprising an upper portion having a collar 190, and flaps 191, and 192, for the chest and back. The lower portion 195, is provided with a securing means comprising straps 196, and buckles 197, whereby said lower portion may be tightly drawn about the form and maintain the upper body members in position, the whole cover forming a comparatively smooth surface over which a garment may be fitted.

Having thus described my invention, I claim:—

1. In a dress form, the combination with a standard, of an adjustable framework consisting of bust and waist forms, said framework being connected to said standard at the center of the back and means located at the front of the form for expanding or contracting the framework, said framework being free from the center of the back to the expanding and contracting means, whereby said framework may be expanded or contracted in an increasing ratio from the center of the back to the front of the form.

2. In a dress form, the combination with a standard, of an adjustable framework consisting of bust and waist forms, said framework being connected to said standard at the center of the back, and means located at the front of the form for expanding and contracting the framework, said framework being free from the center of the back to the expanding and contracting means, whereby said framework may be expanded or contracted in an increasing ratio from the center of the back to the front of the form, and means whereby the length and characteristics of the waist may be varied.

3. In a dress form, the combination with a standard, of an upper and a lower portion each composed of an adjustable framework of contour plates, said framework in each portion being connected to said standard at the center of the back, means in each portion located at the front of the form for expanding and contracting the same, said framework in each portion being free from the center of the back to the expanding and contracting means, whereby the framework in each portion may be expanded or contracted in an increasing ratio from the center of the back to the front of the form.

4. In a dress form the combination with a standard, of an adjustable framework consisting of bust and waist forms, said framework being connected to said standard at the center of the back, and means located at the front of the form for expanding or contracting the framework, said framework being free from the center of the back to the expanding and contracting means, whereby said framework may be expanded or contracted in an increasing ratio from the center of the back to the front of the form, and means for moving the central front portion of the form into proper relation with the remainder of the form.

5. In a dress form the combination with a standard, of an upper and lower portion each composed of an adjustable framework of contour plates, said framework in each portion being connected to said standard at the center of the back, means in each portion located at the front of the form for expanding and contracting the same, said framework in each portion being free from the center of the back to the expanding and contracting means, whereby the framework in each portion may be expanded or contracted in an increasing ratio from the center of the back to the front of the form, and means in each portion for moving the central front portion thereof into proper relation with the remainder of the form.

6. In a dress form, the combination with a standard, of an adjustably related framework, of contour plates, and means arranged to expand and contract said framework, including a sector plate pivoted within the form, and having its curved surface arranged to form a continuation of the curvature of the framework.

7. In a dress form, the combination with a standard, of an adjustably related framework, of contour plates, and means arranged to expand and contract said framework, including a sector plate pivoted within the form and having its curved surface arranged to form a continuation of the curvature of the framework, and means for bodily adjusting said sector plate for moving the curved portion thereof into proper relation with the remainder of the form.

8. In a dress form, the combination with a standard, of an adjustably related framework, of contour plates, and means arranged to expand and contract said framework, including pivoted sector plates, having opposite ends of the curved surfaces thereof, connected to said framework and means for adjusting said sector plates about their pivots.

9. In a dress form, the combination with a standard, of an adjustably related framework, of contour plates, and means arranged to expand and contract said framework, including pivoted sector plates, having opposite ends of the curved surfaces thereof, connected to said framework, means for adjusting said sector plates about their pivots, and means for moving bodily said sector plates to properly position the same relative to the remainder of the form.

10. In a dress form, the combination of a standard, of an upper and lower section each composed of an adjustable framework, of contour plates, a sector plate operatively connected with the framework of each section, a rack carried by said sector plate, and means for engaging the rack for rotating said sector plate.

11. In a dress form, the combination with a standard, of an upper section, and a lower section independent of and disconnected from said upper section, each of said sections being composed of a framework, of contour plates, independent means for supporting said sections by the standard, and means whereby the position of each section may be varied vertically and angularly with relation to the other section.

12. In a dress form, the combination with a standard, of a framework consisting of contour plates, means for connecting said framework to said standard at the center of the back, means located at the front of the form for independently expanding and contracting each half of the form, said framework being free from the center of the back to the expanding and contracting means, whereby said framework may be expanded or contracted in an increasing ratio from the center of the back to the front of the form.

13. In a dress form, the combination with a standard, of a framework consisting of contour plates, means for connecting said framework to said standard at the center of the back, means located at the front of the form for independently expanding and contracting each half of the form, said framework being free from the center of the back to the expanding and contracting means, whereby said framework may be expanded or contracted in an increasing ratio from the center of the back to the front of the form, and means for moving the central front portion of the framework into proper relation with the remainder of the framework.

14. In a dress form, the combination with a framework, of connected contour plates for the neck, shoulder, and chest portions, of means for simultaneously varying the dimensions of the neck and shoulder portions, independently of the chest portion.

15. In a dress form, the combination with a framework of contour plates for the neck, shoulder, and chest portions, means for simultaneously varying the cross section of the neck portion and the width of the form at the arm holes, and means for varying the height of the shoulders.

In testimony whereof, I have hereunto signed my name, at Philadelphia, Pennsylvania, this twenty-third day of June 1908.

ROBERT RUBIN.

Witnesses:
   JAMES H. BELL,
   E. L. FULLERTON.